United States Patent
Rea et al.

(10) Patent No.: US 9,802,721 B2
(45) Date of Patent: Oct. 31, 2017

(54) MACHINE AND METHOD FOR PACKING CAPSULES IN MULTI-CAPSULE PACKS

(71) Applicant: I.M.A. INDUSTRIA MACCHINE AUTOMATICHE S.P.A., Ozzano Dell'Emilia (IT)

(72) Inventors: Dario Rea, Monterenzio (IT); Pierluigi Castellari, Castel San Pietro Terme (IT)

(73) Assignee: GIMA, S.P.A., Zola Predosa (IT)

( * ) Notice: Subject to any disclaimer, the term of this patent is extended or adjusted under 35 U.S.C. 154(b) by 470 days.

(21) Appl. No.: 14/425,197

(22) PCT Filed: Sep. 9, 2013

(86) PCT No.: PCT/EP2013/068645
§ 371 (c)(1),
(2) Date: Mar. 2, 2015

(87) PCT Pub. No.: WO2014/040960
PCT Pub. Date: Mar. 20, 2014

(65) Prior Publication Data
US 2015/0217883 A1    Aug. 6, 2015

(30) Foreign Application Priority Data

Sep. 11, 2012 (IT) .............................. BO2012A0478

(51) Int. Cl.
*B65B 7/16* (2006.01)
*B65B 3/04* (2006.01)
(Continued)

(52) U.S. Cl.
CPC ................ *B65B 7/162* (2013.01); *B65B 3/04* (2013.01); *B65B 7/164* (2013.01); *B65B 29/02* (2013.01);
(Continued)

(58) Field of Classification Search
CPC ..... B65B 2220/16; B65B 57/14; B65B 7/162; B65B 3/04; B65B 7/164; B65B 35/56;
(Continued)

(56) References Cited

U.S. PATENT DOCUMENTS

| 3,143,223 A | 8/1964 | McIntyre et al. |
| 4,002,005 A | 1/1977 | Mueller et al. |

(Continued)

FOREIGN PATENT DOCUMENTS

| EP | 02465783 A1 | 6/2012 |
| JP | H07-002359 | 1/1995 |

(Continued)

*Primary Examiner* — Robert Long
*Assistant Examiner* — Xavier A Madison
(74) *Attorney, Agent, or Firm* — Pearne & Gordon LLP

(57) ABSTRACT

A machine for making and packing capsules (2) for extraction products in multi-capsule packs (27) includes a feeding station (11) for feeding rigid bodies (3) of the capsules, a dosing station (12) for dosing a dose of product within the rigid bodies, a closing station (13) for closing an upper aperture of the rigid bodies with a respective lid (7); a transport element (8) that features a plurality of seats (10) for housing and moving the capsules through the stations; an exit station (17) adapted to draw the capsules from the transport element; and a packing station (23) adapted to pack the capsules in multi-capsule packs where the capsules are arranged side by side and according to a head-to-tail orientation. The invention further provides for a method for making and packing capsules for extraction products in multi-capsule packs.

15 Claims, 5 Drawing Sheets

(51) Int. Cl.

| | |
|---|---|
| *B65B 29/02* | (2006.01) |
| *B65B 35/16* | (2006.01) |
| *B65B 35/56* | (2006.01) |
| *B65B 57/14* | (2006.01) |
| *B65D 77/00* | (2006.01) |
| *B65D 77/04* | (2006.01) |
| *B65D 85/62* | (2006.01) |
| *B65D 85/804* | (2006.01) |
| *B65G 47/86* | (2006.01) |

(52) U.S. Cl.
CPC .............. *B65B 35/16* (2013.01); *B65B 35/56* (2013.01); *B65B 57/14* (2013.01); *B65D 77/003* (2013.01); *B65D 77/0413* (2013.01); *B65D 85/62* (2013.01); *B65D 85/8043* (2013.01); *B65B 2220/16* (2013.01); *B65G 47/847* (2013.01)

(58) Field of Classification Search
CPC   B65B 35/32; B65D 85/8043; B65D 77/0413; B65D 77/003; B65G 47/846
USPC ............................ 198/347; 53/471, 467, 281
See application file for complete search history.

(56) References Cited

U.S. PATENT DOCUMENTS

| | | | |
|---|---|---|---|
| 4,067,433 A * | 1/1978 | Phipps | B65B 35/56 198/374 |
| 4,151,698 A * | 5/1979 | Muller | B65B 3/04 53/131.2 |
| 4,771,589 A | 9/1988 | Mueller et al. | |
| 5,435,431 A | 7/1995 | Baum | |
| 7,926,664 B2 | 4/2011 | De Vlaam | |
| 2008/0217216 A1 | 9/2008 | De Vlaam | |
| 2012/0233967 A1* | 9/2012 | Bellante | B25J 9/0084 53/443 |
| 2015/0013268 A1* | 1/2015 | Rea | B65B 29/02 53/282 |

FOREIGN PATENT DOCUMENTS

| | | |
|---|---|---|
| JP | 2008-529786 A | 8/2008 |
| WO | 2006088362 A2 | 8/2006 |
| WO | 2007091161 A1 | 8/2007 |
| WO | 2011039711 A1 | 4/2011 |

* cited by examiner

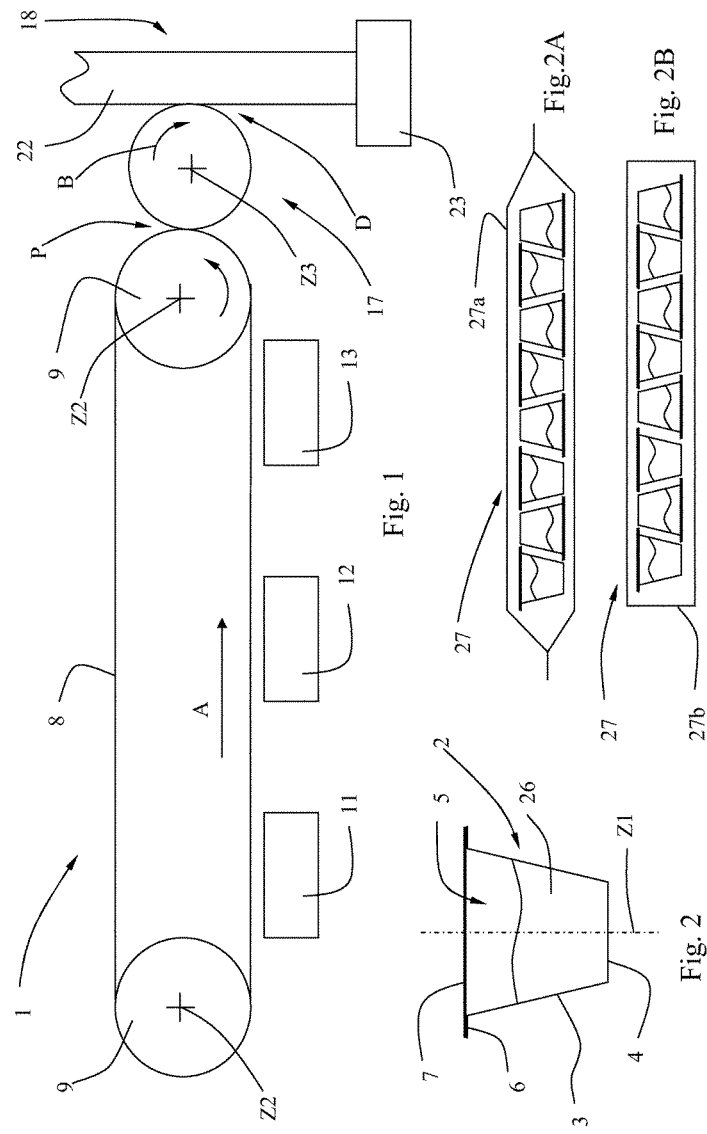

MACHINE AND METHOD FOR PACKING CAPSULES IN MULTI-CAPSULE PACKS

FIELD OF THE INVENTION

The present invention relates to a machine and a method for making and packing single use capsules for extraction or infusion beverages. In particular, the present invention relates to a machine and a method for making and packing single use capsules in multi-capsule packs.

BACKGROUND OF THE INVENTION

The machines referred to in the present invention are adapted to pack capsules comprising, in a minimum configuration:
- a cup-shaped, rigid body, for example of frustoconical shape, that defines a longitudinal axis of the capsule, with a pierceable or pre-punched bottom and an upper aperture provided with an external rim;
- a dose of extraction or infusion product contained within the rigid body; and
- a lid for closing the upper aperture of the rigid body, pre-punched or adapted to be pierced by a nozzle supplying a pressurised liquid.

The capsules of the illustrated type may further comprise one or more filter elements, flexible or rigid, or distributing elements for distributing the pressurised liquid or the obtained beverage.

Such capsules are typically placed on the market in multi-capsule packs, i.e. packs containing more than one capsule. Such multi-capsule packs may be boxes, cartoons, flow packs, etc. In such multi-capsule packs there is known to arrange the capsules side by side and rotated by 180° about an axis perpendicular to the longitudinal axis of the capsule to save space. In multi-capsule packs, the capsules are thus arranged with respective longitudinal axis mutually parallel and are oriented in opposite sense, so as to be arranged according to a head-to-tail orientation.

SUMMARY OF THE INVENTION

It is an object of the present invention to provide a machine and a method for making and packing capsules in multi-capsule packs, where the capsules are arranged side by side and oriented in opposite senses, that are fast, convenient and reliable.

Such object is achieved by a machine according to claim 1 and a method according to claim 13.

BRIEF DESCRIPTION OF THE FIGURES

The invention will be described with reference to the attached drawings, which are given for illustrative and non-limiting purposes only, in which:

FIG. 1 is a schematic plan view of a machine according to the invention;

FIG. 2 is a schematic cross section view of a single use capsule for extraction or infusion beverages;

FIG. 2A is a schematic cross section view of a first example of a multi-capsule pack;

FIG. 2B is a schematic cross section view of a second example of a multi-capsule pack;

DETAILED DESCRIPTION OF THE INVENTION

Figure 3:
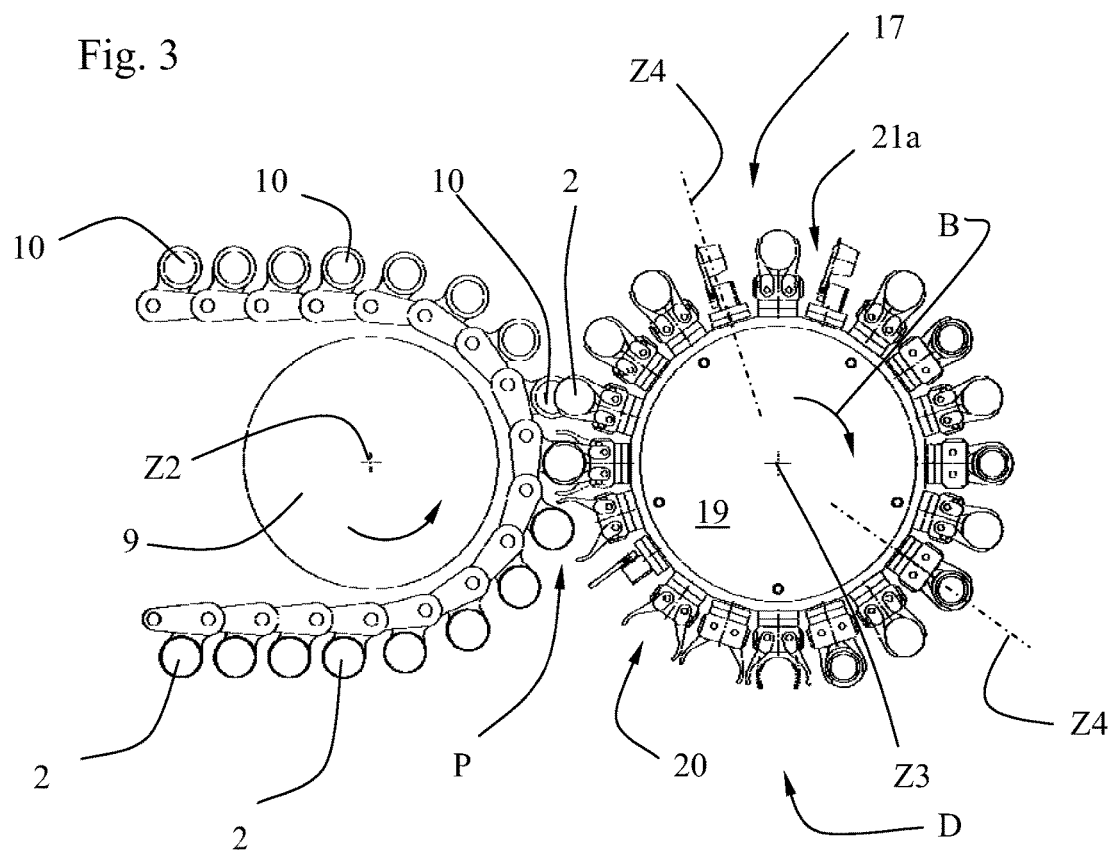
FIG. 3 is a schematic plan view of an exit station of the machine according to a first preferred embodiment of the invention.

A machine 1 according to the invention is adapted to make capsule 2, of single use type, for extraction or infusion beverages. In FIG. 2 there is illustrated a capsule 2 in a minimum, non-limiting, configuration, meaning that the machine and method according to the invention can be also utilised for making and packing capsules with different shape, configuration, components and ways of use.

The capsule 2 illustrated in FIG. 2 includes a rigid body 3 that defines a longitudinal axis $Z1$ of the capsule 2. The rigid body 3 features a bottom 4 and an upper aperture 5 provided with an external rim 6. The upper aperture 5 is closed by a lid 7 joined to the external rim 6, for example by gluing or hot or cold sealing. The capsule 2 further includes, within the rigid body 3, a dose 26 of product in powder, granules or leaves, such as for example coffee, tea, milk, chocolate, or mixtures thereof. The rigid body 3 has, for example, frustoconical shape, but it is understood that capsules 2 with rigid body 3 of different shape can be made and packed by the machine and method according to the invention. Equally, capsules 2 including filter or distributing elements, either rigid or flexible (not illustrated for sake of simplicity), can be made and packed by the machine and method according to the invention.

The machine 1 includes a transport element 8 adapted to move the capsule 2 being formed through a plurality of operative stations through an operative path along an advancing direction A.

The transport element 8 is closed in a loop around movement organs 9. In the embodiment schematically illustrated in FIG. 1, the movement organs 9 are movable in rotation about vertical rotation axes $Z2$ and move the transport element 8 on a horizontal plane. Alternatively, the movement organs 9 can be movable in rotation about horizontal rotation axes and move the transport element 8 on a vertical plane, including at least one horizontal tract at which the operative stations are arranged.

The transport element 8 includes a plurality of seats 10 adapted to house the rigid body 3 of the capsule 2.

The movement organs 9 are movable continuously, or intermittently, to continuously, or intermittently move the transport element 8 along the advancing direction A.

In a minimum configuration, the machine 1 includes a feeding station 11 for feeding the rigid bodies 3 to respective seats 10 of the transport element 8, a dosing station 12 for dosing a dose 26 of product within respective rigid bodies 3, and a closing station 13 for closing the upper aperture 5 of the rigid body 3 with a respective lid 7. Depending on the type of capsule 2 to be made, the machine 1 can further comprise, along the operative path, further stations, for example one or more feeding stations for feeding filter and/or distributing elements, one or more forming stations for forming the filter and/or distributing elements, one or more cutting stations for cutting the filter and/or distributing elements and/or lids, one or more weighing and checking stations.

Associated to the transport element 8, the machine 1 includes detaching organs 14 (visible in FIGS. 4 and 6), adapted to extract the capsules 2 from the respective seats 10 of the transport element 8 at a drawing zone P.

Advantageously, the drawing zone P is situated at a curved tract of the operative path of the transport element 8. Advantageously, in the embodiment illustrated in the figures, the drawing zone P is situated in correspondence of a movement organ 9. Alternatively, in an embodiment not illustrated, the drawing zone P can be situated in correspondence of a rectilinear tract of the operative path of the transport element 8.

Advantageously, the detaching organs 14 include rods 15, vertically movable, each associated to a respective seat 10 of the transport element 8. The rods 15 are thus movable in phase with the respective seats 10 along the operative path, at least at the drawing zone P. The rods 15 are positioned below the respective seats 10 and feature an upper end 16, adapted to contact and push upwards the bottom 4 of the capsule 2. Advantageously, the upper end 16 is provided with a suction source to firmly and securely retain the capsule 2. Alternatively, the detaching organs 14 can comprise rods positioned above the seats 10 and the capsules 2, and featuring a bottom end provided with a suction source to contact the lid 7 and pull the capsule 2 upwards.

In case the transport element 8 is intermittently moved, it is possible to use one single rod, vertically movable, positioned stationary at the drawing zone P.

The machine 1 further includes, at the drawing zone P, an exit station 17 adapted to draw the capsules 2 from the transport element 8 and to delivery such capsules 2, at a delivery zone D, on transport means 18 of a packing station 23 adapted to pack the capsules 2 in multi-capsule packs 27, like boxes, flow packs 27a, cartoons 27b, etc.

In detail, the exit station 17 includes a drawing carousel 19, movable continuously or intermittently, as the transport element 8.

The drawing carousel 19 is movable in rotation according to a rotation sense B, for example clockwise in the figures, about a rotation axis Z3 parallel to the rotation axis Z2 of the movement organ 9. In the embodiments illustrated in the figures, the rotation axis Z3 is vertical. In an alternative embodiment not illustrated in which the transport element 8 is movable on a vertical plane about movement organs 9 movable in rotation about horizontal rotation axes Z2, the drawing carousel 19 is movable in rotation about a horizontal rotation axis Z3.

The drawing carousel 19 is provided with gripping elements 20 adapted to take the capsules 2 from the detaching organs 14. The gripping elements 20 include a plurality of gripping pliers 21a, 21b radially arranged on the drawing carousel 19. All, or every other, gripping pliers 21a, 21b, are movable in rotation about respective radial rotation axes Z4, perpendicular to the vertical rotation axis Z3 of the drawing carousel 19.

The gripping pliers 21a, 21b includes pairs of arms 24a, 24b movable between a non-operative position, away from the capsule 2, and an operative position in which said pairs of arms 24a, 24b retain the capsule 2 in correspondence of the rigid body 3, advantageously of the external rim 6.

Figure 4:
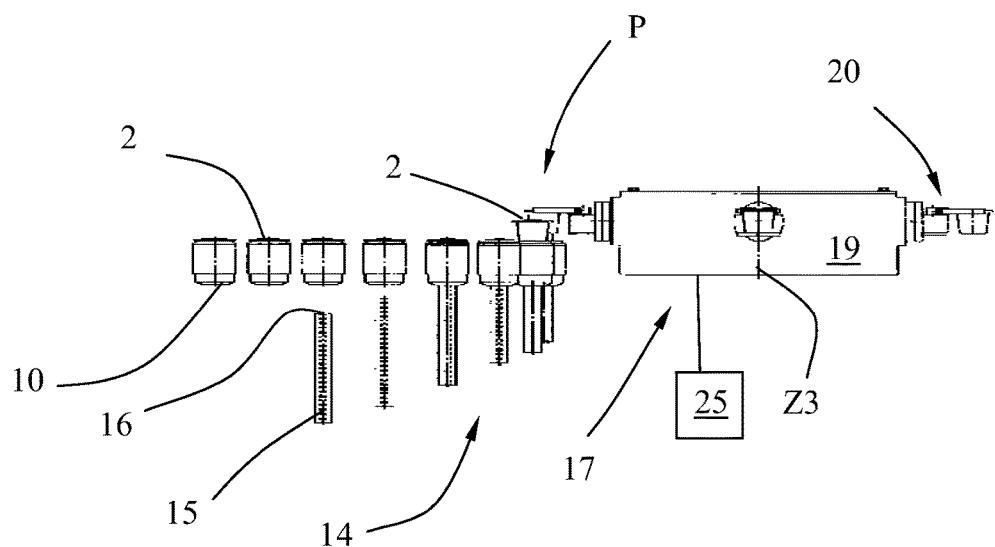
FIG. 4 is a schematic front view of the exit station of FIG. 3.
Figure 10:
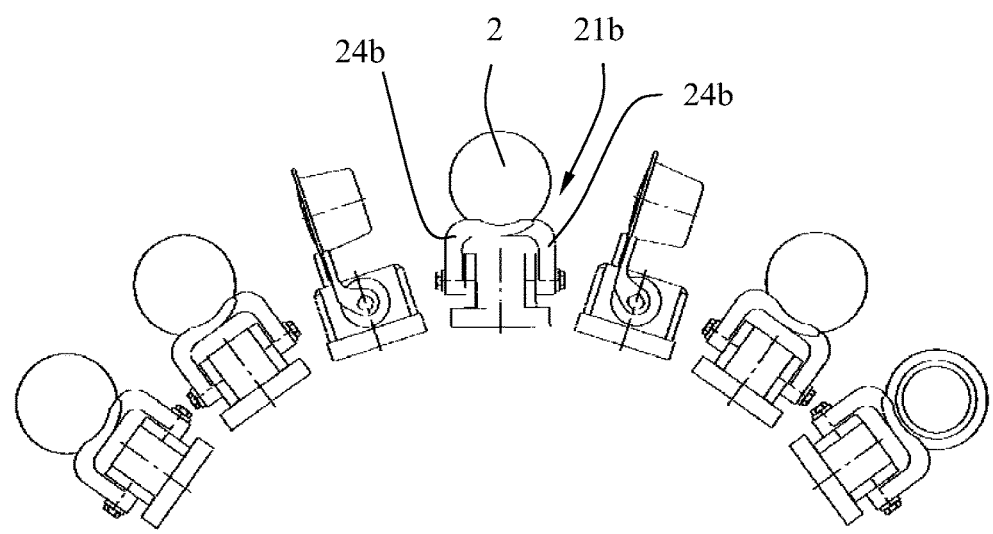
FIG. 10 is a schematic plan view of enlarged details of the exit stations of the machine according to the second and forth preferred embodiment of the invention.

In particular, according to a first preferred embodiment illustrated in FIGS. 3, 4 e 9, passing from the non-operative position to the operative position, and viceversa, the arms 24a of the gripping pliers 21a move perpendicularly to the longitudinal axis Z1 of the capsule 2, in rotation about respective rotation axes parallel to the longitudinal axis Z1 of the capsule 2. In other words, in correspondence of the drawing zone P the arms 24a of the gripping pliers 21a are movable on a horizontal plane and are adapted to retain the capsules 2 in correspondence of the rigid body 3, advantageously of the external rim 6. According to a second preferred embodiment illustrated in FIGS. 5, 6 and 10, the arms 24b of the gripping pliers 21b move parallelly to the longitudinal axis Z1 of the capsule 2, in rotation about respective rotation axis perpendicular to the longitudinal axis Z1 of the capsule 2. In other words, in correspondence of the drawing zone P, the arms 24b of the gripping pliers 21b are movable on a vertical plane and are adapted to retain the capsule 2 in correspondence of the external rim 6.

As the capsules 2 are intended to be packed in multi-capsule packs 27 where are arranged side by side and oriented in opposite senses, the gripping pliers 21a, 21b alternatively rotate the capsules 2 by 180° about respective radial rotation axes Z4. In other words, the gripping pliers 21a, 21b rotate the capsules 2 according to a rotation order that provides for rotating, about respective radial rotation axes Z4, every other capsules 2. So rotated, the gripping pliers 21a, 21b deposit the capsules 2 on the transport means 18, that comprises for example a conveyor belt 22, on which the capsules 2 lie.

The transport means 18 may advantageously further include one or more toothed belts, movable in rotation about vertical axis. Such toothed belts make simpler, faster and more precise to position the capsules 2 on the conveyor belt 22. Furthermore, the toothed belts enable, already on the conveyor belt 22, to realize separated groups of capsules 2, each group being intended to be packed in a single multi-capsule pack 27.

Figure 7:
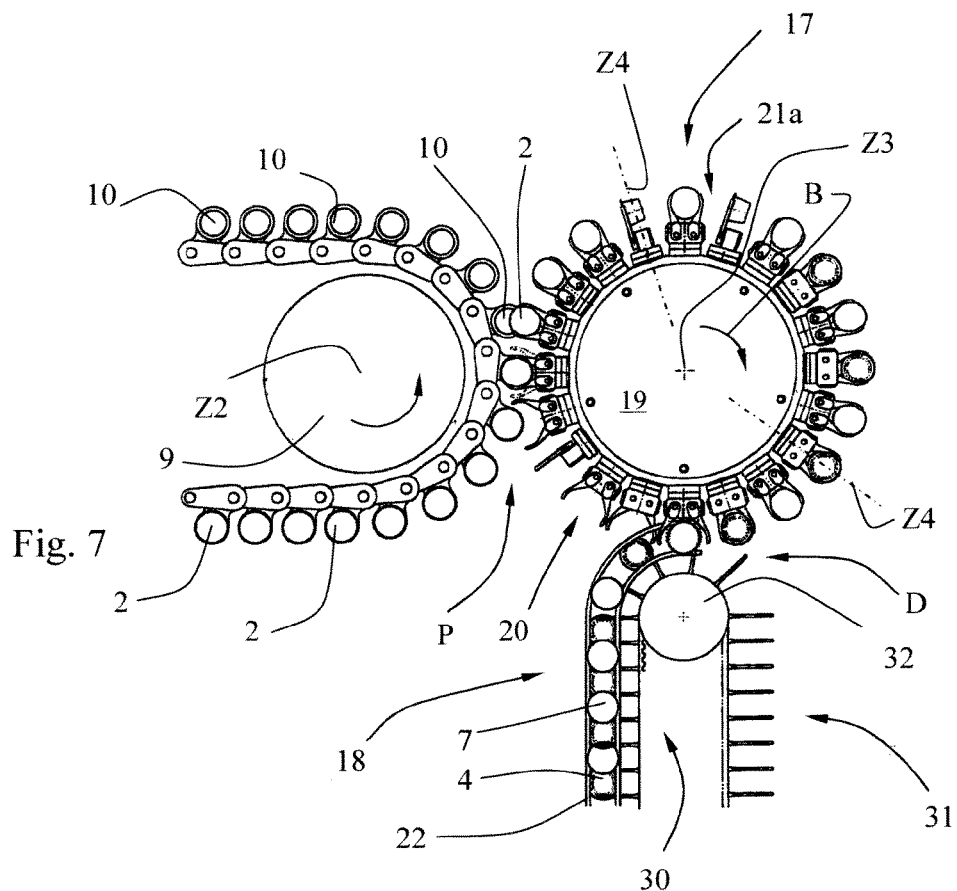
FIG. 7 is a schematic plan view of an exit station of the machine according to a third preferred embodiment of the invention.

In FIG. 7 there is illustrated a third preferred embodiment of the invention in which the transport means 18 includes a first toothed belt 30 and a second toothed belt 31 adapted to cooperate with the gripping pliers 21a of the drawing carousel 19 to position the capsules 2 on the conveyor belt 22, positioned below the same toothed belts 30, 31 and arranged radially with respect to the drawing carousel 19 at the delivery zone D.

The first toothed belt 30 and the second toothed belt 31 are movable in phase with each other and with the drawing carousel 19 about pulleys 32 driven in rotation, for example by means of servomotors, about vertical axes. The toothed belts 30, 31 are moved to achieve distinct groups of capsules 2, each group of capsules 2 being packed in a single multi-capsule pack 27. In other words, the servomotors are adapted to move the first toothed belt 30 and the second toothed belt 31 in such a way that, while a first toothed belt is moved in phase with the drawing carousel to take delivery of the capsules 2, the other toothed belt is moved independently from the drawing carousel 19 to deliver a group of capsules 2 (previously taken from the gripping pliers 21a) to be packed in a single multi-capsule pack 27 to a packing zone of the packing station 23.

Furthermore, the servomotors are adapted to slow down or even stop the toothed belts 30, 31, one independently from the other, in case, for example, one or two subsequent gripping pliers 21$a$ do not carry a respective capsule 2, for example because the capsule 2 is rejected, as explained below. In detail, in order not to form incomplete groups of capsules 2, i.e. with a number of capsules 2 smaller than the number of capsules that has to be packed in a single multi-capsule pack 27, the toothed belt (30 or 31) that is destined to couple with the gripping pliers 21$a$ that do not carry the respective capsule 2 is intended to slow down or even stop to let such gripping pliers 21$a$ that do not carry the respective capsule 2 pass beyond the delivery zone D. Once such gripping pliers 21$a$ have passed, the toothed belt is adapted to re-couple with the drawing carousel 19, in phase with the subsequent gripping pliers 21$a$ that carry respective capsules 2. Therefore, each tooth of the toothed belts 30, 31 cooperates with one capsule 2 and on the conveyor belt 22 no empty spaces, i.e. spaces not occupied by capsules 2, are created.

Figure 5:
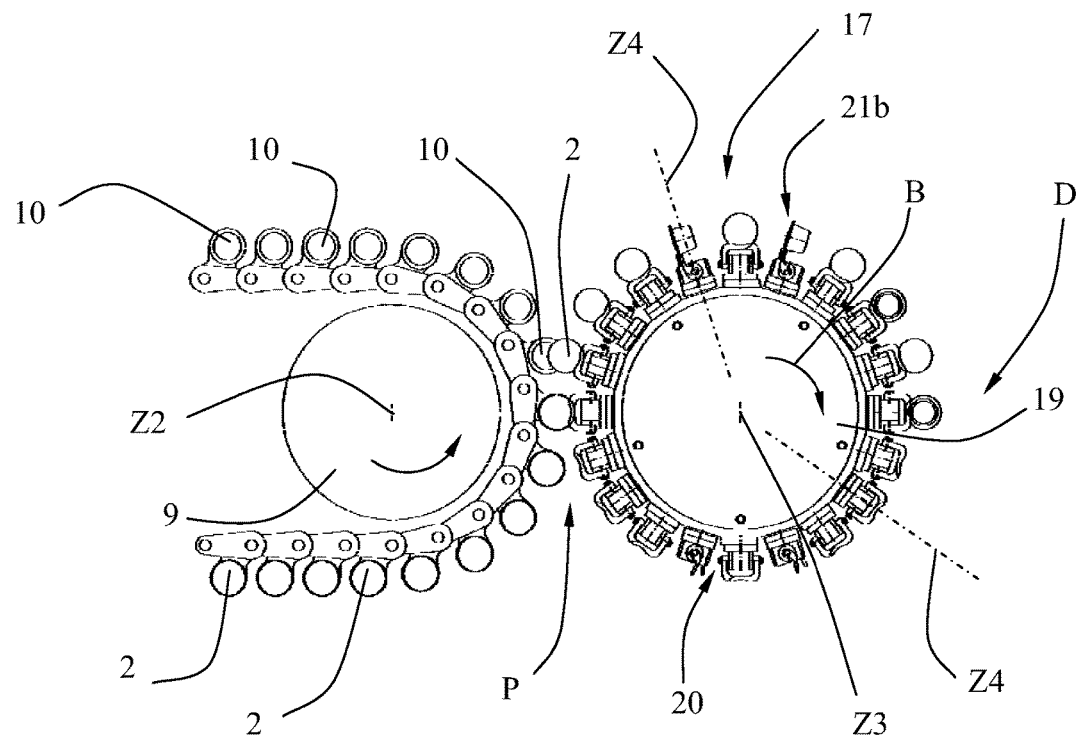
FIG. 5 is a schematic plan view of an exit station of the machine according to a second preferred embodiment of the invention.
Figure 6:
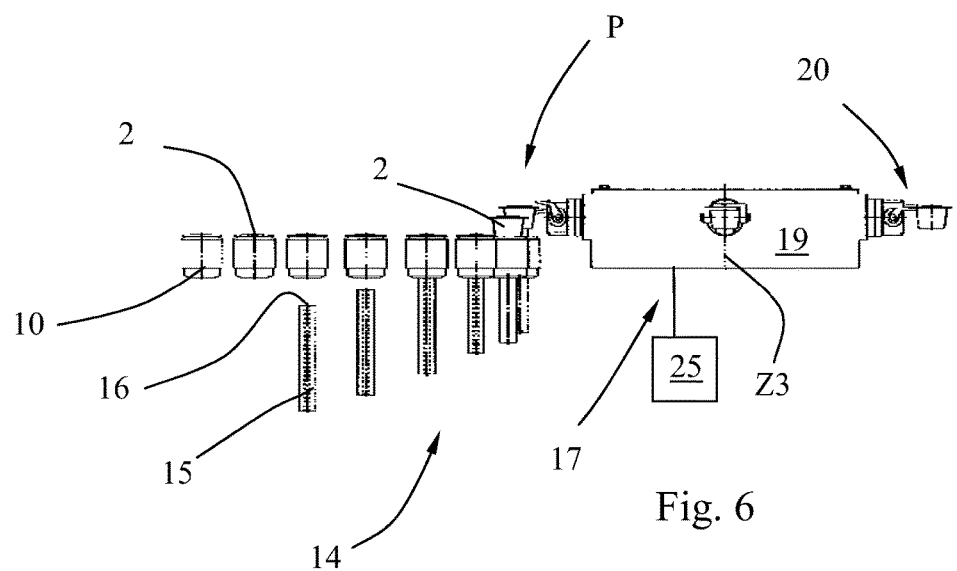
FIG. 6 is a schematic front view of the exit station of FIG. 5.
Figure 8:
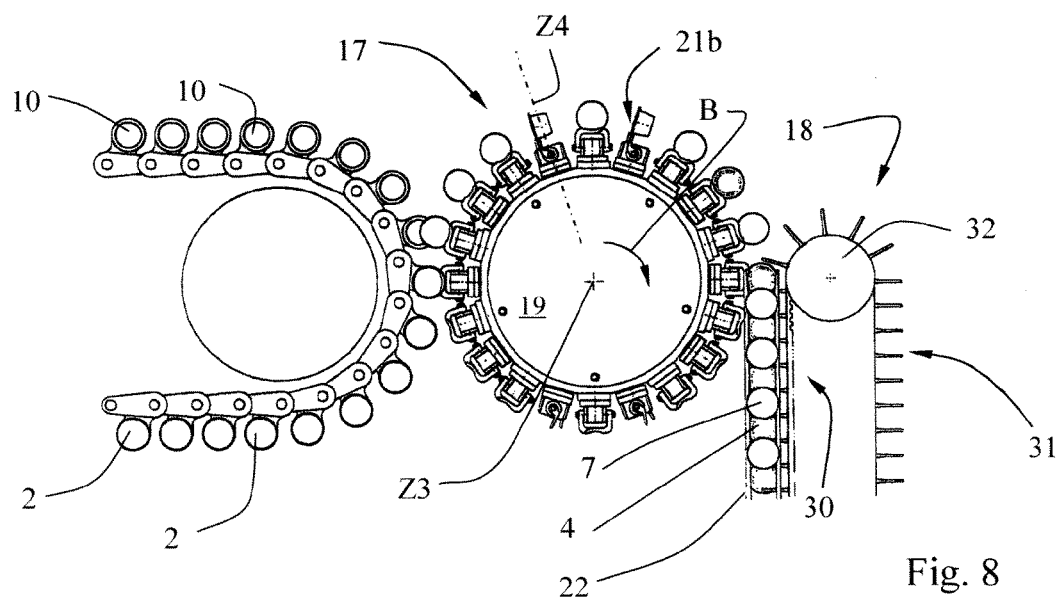
FIG. 8 is a schematic plan view of an exit station of the machine according to a forth preferred embodiment of the invention.
Figure 9:
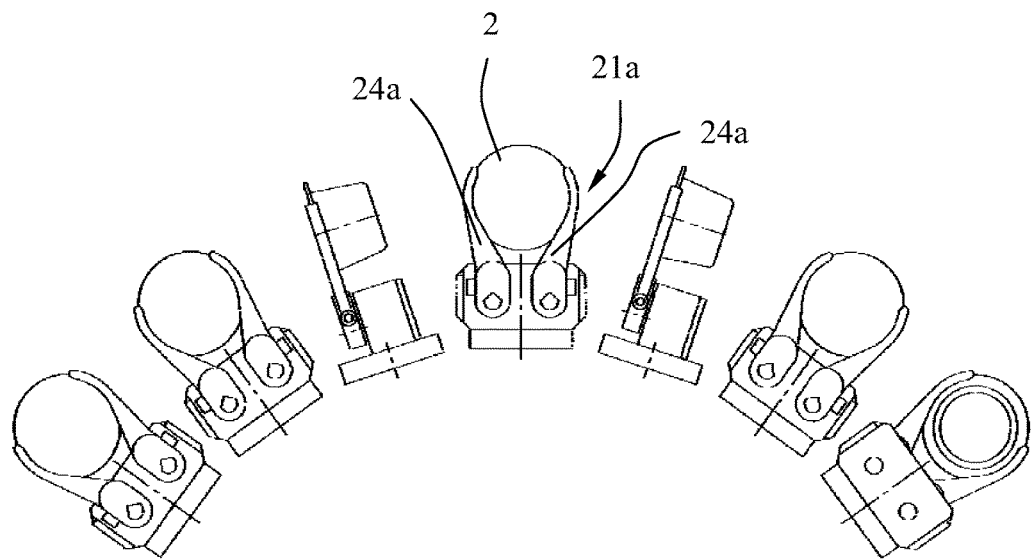
FIG. 9 is a schematic plan view of enlarged details of the exit stations of the machine according to the first and third preferred embodiment of the invention.

In FIG. 8, there is illustrated a forth preferred embodiment of the invention, that differs from the second preferred embodiment illustrated with reference to FIGS. 5 and 6 in that it comprises transport means 18 analogous to those illustrated in FIG. 7 with reference to the third preferred embodiment and therefore indicated with the same reference numbers. In detail, the transport means 18 includes a first toothed belt 30 and a second toothed belt 31 adapted to cooperate with the gripping pliers 21$b$ of the drawing carousel 19 and to position the capsules 2 on the conveyor belt 22 arranged below the same toothed belts 30, 31.

Differently from the embodiment illustrated in FIG. 7, the conveyor belt 22 is arranged tangentially to the drawing carousel 19 at the delivery zone D. What previously described as to the toothed belts 30, 31 with reference to the third preferred embodiment of the invention applies also to the forth preferred embodiment of the invention illustrated in FIG. 8 and therefore it is not repeated here.

Although not illustrated, it is possible to use transport means 18 including three or more toothed belts, for example when relatively high operation speeds are required.

In alternative non-illustrated embodiments, the transport means 18 may include a transport carousel.

Once positioned with the correct head-to-tail orientation, the capsules 2 can be packed in the packing station 23, for example the capsules 2 may be pushed within the multi-capsule packs 27.

In order to rotate only half of the capsules 2, only half of the gripping pliers 21$a$, 21$b$ may be adapted to rotate about the respective radial rotation axis Z4, perpendicular to the vertical rotation axis Z3 of the drawing carousel 19.

It may be advantageous, for example for rejecting faulty capsules, as will be clarified in the following description, that all of the gripping pliers 21$a$, 21$b$ be adapted to rotate about respective radial rotation axes Z4, perpendicular to the vertical rotation axis Z3 of the drawing carousel 19.

If there results a faulty capsule, for example because found out-of-weight in a weighing and checking station arranged upstream of the drawing zone P, control devices associated to the machine 1 may provide for rejecting the faulty capsule 2, for example by inhibiting the detaching organs 14. In detail, the control devices may inhibit the rod 15 associated to the seat 14 that carries the capsule 2 to be rejected, in order not to extract from the respective seat 10 such capsule 2, so that the latter be not taken by the gripping elements 20 of the drawing carousel 19, but be rejected in a rejecting station downstream of the drawing zone P. Alternatively, the capsule 2 to be rejected may be drawn from, and rejected in, the drawing carousel 19.

In order to maintain the head-to-tail orientation of the capsules 2 to be packed, it is advantageous to reject, together with the faulty capsule 2, also an immediately subsequent (or preceding) capsule, even if not faulty. In other words, it is advantageous to reject a pair of adjacent capsules 2, one of which faulty. In such case, only half of the gripping pliers 21$a$, 21$b$ may be adapted to rotate about respective radial rotation axes Z4, because once a pair of adjacent capsules 2 is rejected, the rotation order of the remaining capsules 2 is not modified.

Alternatively, providing all of the gripping pliers 21$a$, 21$b$ rotatable about the respective radial rotation axes Z4, it is possible to reject the faulty capsule 2 only and to modify the rotation order of the capsules 2 subsequent to the rejected capsule 2, to rotate, or not to rotate, the capsules 2 subsequent to such rejected capsule 2, so as to maintain the head-to-tail orientation of the capsules 2 in the transport means 18.

The drawing carousel 19 is moved in rotation by a motor 25. The same motor 25, by means of transmission systems, for example of the cam type, also opens and closes the gripping pliers 21$a$, 21$b$ and moves the latters in rotation about the respective radial rotation axes Z4, in proper phase with respect to the rotation of the drawing carousel 19. In detail, the gripping pliers 21$a$, 21$b$ are connected to cam devices to move the arms 24$a$, 24$b$ so as to close onto the capsules 2 at the drawing zone P and to open and release the capsules 2 on the transport means 18, and to rotate the arms 24$a$, 24$b$ about the respective radial rotation axis Z4 in order to rotate every other capsules 2 by 180°, so that every other capsule is delivered, rotated by 180°, on the transport means 18.

The transport means 18, in particular the conveyor belt 22 is positioned in proximity of the drawing carousel 19 at the delivery zone D, where the conveyor belt 22 results, advantageously, positioned tangentially (as in the embodiments of FIGS. 1, 5, 6 e 8), or radially (as in the embodiments of FIGS. 3, 4 e 7) to the drawing carousel 19.

The delivery zone D, depending on the arrangement and operative requirements of the packing station 23 and on the operative speed requested to the drawing carousel 19, may be positioned in different points of the drawing carousel 19. In the embodiments of FIGS. 3, 4 and 7 for example, the delivery zone D is placed 270° downstream of the drawing zone P, while in the embodiments of FIGS. 1, 5, 6 and 8 is placed 180° downstream of the drawing zone P.

In other words, the cam devices associated to the drawing carousel 19 in the preferred embodiments of FIGS. 3, 4 and 7, and of FIGS. 1, 5, 6 and 8, respectively, are adapted to rotate the capsules 2 by 180° about the respective radial rotation axes Z4 during a rotation of 270°, or 180°, respectively, of the drawing carousel 19 about the rotation axis Z3.

The invention further provides for a method for forming and packing capsules 2 in multi-capsule packs 27, where the capsules 2 are arranged side by side and alternatively rotated by 180°, thus arranged according to a head-to-tail orientation.

The method includes the step of feeding the rigid bodies 3 to respective seats 10 of the transport element 8, movable through a plurality of operative stations of a filling machine through an operative path along an advancing direction A; dosing a dose 26 of product within the rigid bodies 3; closing the upper aperture 5 of the rigid body 3 with a respective lid 7; and transferring the capsules 2 to the packing station 23.

In particular, the method provides that transferring the capsules 2 to the packing station 23 includes detaching the capsules 2 from the respective seats 10 by means of the detaching organs 14 associated to the seats 10 of the transport element 8 at the drawing zone P; gripping, at the drawing zone P, the capsules 2 from the detaching organs 10 by means of the gripping elements 20 radially arranged on the drawing carousel 19 rotating about the vertical rotation axis Z3; rotating all of the capsules 2 about the vertical rotation axis Z3 of the drawing carousel 19 and rotating every other capsule 2 about respective radial rotation axes Z4, perpendicular to the vertical rotation axis Z3 of the drawing carousel 19; carrying the capsules 2 from the drawing zone P to the delivery zone D at the packing station 23, every other capsule 2 being rotated by 180° about the respective radial rotation axes Z4, perpendicular to the vertical rotation axis Z3 of the drawing carousel 19; delivering the capsules 2, rotated and arranged side by side and according to the head-to-tail orientation, to the packing station 23.

Advantageously, it is possible, according to a preferred embodiment of the method of the invention, to reject faulty capsules 2. In detail, the method according to the invention may include further steps of inhibiting the detaching organs 14 associated to seats 10 carrying faulty capsules 2 by means of control devices, so that such faulty capsules 2 are not transferred to the packing station 23; and rejecting such faulty capsules 2.

The capsules 2 subsequent to the rejected capsule 2 are rotated or not in the drawing carousel 19 by 180° about the respective radial rotation axes Z4 perpendicular to the vertical rotation axis Z3 of the drawing carousel 19 to maintain the head-to-tail orientation of the capsules 2 in the packing station 23. In other words, the capsules 2 subsequent to the rejected capsule 2 are rotated or not contrary to what would have happen if the rejected capsule 2 had not been rejected.

Alternatively, it is possible to inhibit the detaching organs 14 associated to seats 10 carrying a faulty capsule 2 and an adjacent capsule 2, immediately preceding or subsequent to the faulty capsule 2, by means of the control device, so that such faulty capsule 2 and such adjacent capsule 2 be not transferred to the packing station 23; and to reject the faulty capsule 2 and the adjacent capsule 2. Therefore, by rejecting a pair of capsules 2 including the faulty capsule 2, it is possible not to alter the rotation order of the capsules 2 on the drawing carousel 19.

The invention claimed is:

1. Machine for making and packing capsules (2) for extraction or infusion products in multi-capsule packs (27), the capsules (2) including:
  a rigid body (3) defining a longitudinal axis (Z1) of the capsule (2) and featuring a bottom (4) and an upper aperture (5) provided with an external rim (6),
  a dose (26) of extraction or infusion product contained in the rigid body (3), and
  a closing lid (7) joined to the external rim (6) to close the upper aperture (5); the machine including:
  a plurality of operative stations, between which at least a feeding station (11) for feeding the rigid bodies (3), a dosing station (12) for dosing a dose (26) of product within the rigid bodies (3), a closing station (13) for closing the upper aperture (5) of the rigid body (3) with a respective closing lid (7);
  a transport element (8) featuring a plurality of seats (10) for housing and moving the capsules (2) through said plurality of operative stations along an advancing direction (A),
  an exit station (17) adapted to draw the capsules (2) from the transport element (8); and
  a packing station (23) adapted to receive the capsules (8) from the exit station (17) and adapted to pack the capsules (2) into multi-capsule packs (27) where the capsules (2) result side by side and alternatively rotated by 180°, thus arranged according to a head-to-tail orientation,
  the machine being characterised in that
  detaching organs (14) are associated to the transport element (8) and are adapted to move the capsules (2) away from the seats (10) at a drawing zone (P); and
  said exit station (17) includes a drawing carousel (19) provided with gripping elements (20) for gripping the capsules (2) from the detaching organs (14), rotating said capsules (2) according to a rotation order that provides for rotating every other capsule (2) by 180° and delivering said capsules (2) so rotated, arranged side by side and according to the head-to-tail orientation, to the packing station (23).

2. Machine according to claim 1, wherein said detaching organs (14) are movable in phase with the transport element (8) along the advancing direction (A) at least at the drawing zone (A).

3. Machine according to claim 1, wherein said detaching organs (14) include rods (15), vertically movable, adapted to lift said capsules (2) at said drawing zone (P).

4. Machine according to claim 1, wherein said drawing carousel (19) is movable in rotation about a vertical rotation axis (Z3).

5. Machine according to claim 4, wherein said gripping elements (20) includes a plurality of gripping pliers (21*a*, 21*b*), radially arranged onto said drawing carousel (19) and movable in rotation about respective radial rotation axes (Z4), perpendicular to the vertical rotation axis (Z3) of the drawing carousel (29).

6. Machine according to claim 5, wherein said gripping pliers (21*a*, 21*b*) include pairs of arms (24*a*, 24*b*), movable between an inoperative position, far away from the capsule (2), and an operative position in which said pairs of arms (24*a*, 24*b*) retain the capsule (2), in correspondence of the rigid body (3) or the external rim (6).

7. Machine according to claim 1, including control devices adapted to inhibit the detaching organs (14) in order not to extract faulty capsules (2) from respective seats (10), so that said faulty capsules (2) be not taken by the gripping elements (20) of the drawing carousel (19).

8. Machine according to claim 7, wherein said control devices are adapted to inhibit the detaching organs (14) in order not to extract from respective seats (10) a faulty capsule (2) and an adjacent capsule (2), immediately preceding or successive to said faulty capsule (2).

9. Machine according to claim 1, wherein said packing station (23) includes transport means (18) including a conveyor belt (22) adapted to receive from said gripping elements (20) said capsules (2) according to the rotation order.

10. Machine according to claim 9, wherein said transport means (18) further include at least one toothed belt (30, 31), movable about pulleys (32) rotatable about vertical axes, said at least one toothed belt (30, 31) being adapted to cooperate with the gripping elements (20) to position the capsules (2) on to the conveyor belt (22).

11. Machine according to claim 10, wherein said transport means (18) include at least one first toothed belt (30) and at least one second toothed belt (31), movable in phase with each other, to form distinct groups of capsules (2), each group of capsules (2) being packed in a single multi-capsule pack (27).

12. Machine according to claim 11, wherein said at least one first toothed belt (30) and said at least one second toothed belt (31) are adapted to slow down or stop, independently from each other, in order not to cooperate with gripping elements (20) not carrying capsules (2), because previously rejected, and are adapted to move again in phase with successive gripping elements (20) that carry respective capsules (2).

13. Method for making and packing capsules (2) in multi-capsule packs (27), said capsules (2) including a rigid body (3) defining a longitudinal axis (Z1) of the capsule (2) and featuring a bottom (4) and an upper aperture (5) provided with an external rim (6), a dose (26) of extraction or infusion product contained in the rigid body (3), and a closing lid (7), joined to the external rim (6) to close the upper aperture (5); said capsules (2) being in said multi-capsule packs (27) arranged side by side and alternatively rotated by 180°, thus arranged according to a head-to-tail orientation, the method including the steps of:

feeding rigid bodies (3) to respective seats (10) of a transport element (8) movable through a plurality of operative stations (11, 12, 13) of a filling machine through an operative path along an advancing direction (A);

dosing a dose (26) of product within the rigid bodies (3);

closing the upper aperture (5) of the rigid body (3) with a respective closing lid (7);

transferring the capsules (2) to a packing station (23); the method being characterised in that the step of transferring the capsules (2) to a packing station (23) includes:

detaching the capsules (2) from the respective seats (10) by means of detaching organs (14) associated to said seats (10) of the transport element (8) at a drawing zone (P);

gripping, at the drawing zone (P), said capsules (2) from said detaching organs (10) by means of a plurality of gripping elements (20) radially arranged on a drawing carousel (19) rotating about a vertical rotation axis (Z3);

rotating all of the capsules (2) about the vertical rotation axis (Z3) of the drawing carousel (19) and rotating every other capsule (2) about respective radial rotation axes (Z4), perpendicular to the vertical rotation axis (Z3) of the drawing carousel (19);

carrying the capsules (2) from the drawing zone (P) to a delivery zone (D) at the packing station (23), every other capsule (2) being rotated by 180° about respective radial rotation axes (Z4), perpendicular to the vertical rotation axis (Z3) of the drawing carousel (19);

delivering said capsules (2), arranged side by side and according to the head-to-tail orientation to the packing station (23).

14. Method according to claim 13, including the further steps of:

inhibiting the detaching organs (14) associated to seats (10) carrying faulty capsules (2) by means of control devices, so that said faulty capsules (2) are not transferred to the packing station (23);

rejecting said faulty capsules (2).

15. Method according to claim 13, including the further steps of:

inhibiting the detaching organs (14) associated to seats (10) carrying a faulty capsule (2) and an adjacent capsule (2), immediately preceding or successive to said faulty capsule (2), by means of control devices, so that said faulty capsule (2) and said adjacent capsule (2) be not transferred to the packing station (23);

rejecting said faulty capsule (2) and said adjacent capsule (2).

* * * * *